Sept. 30, 1930.   F. W. JOHNSON   1,777,169
PUMP JACK
Filed Oct. 19, 1928   2 Sheets-Sheet 1
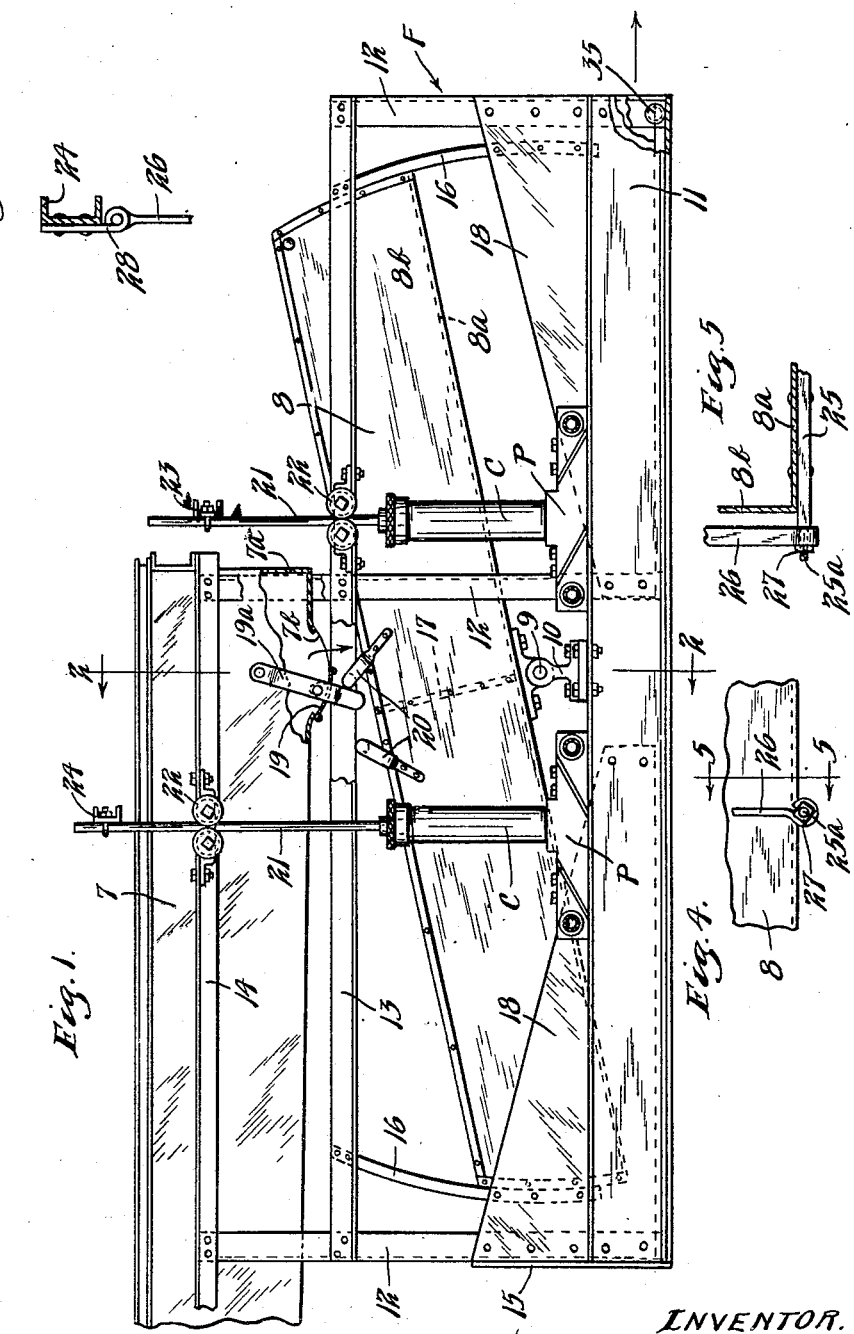
INVENTOR.
FREDERICK W. JOHNSON.
BY HIS ATTORNEYS
Williamson Reik Williamson

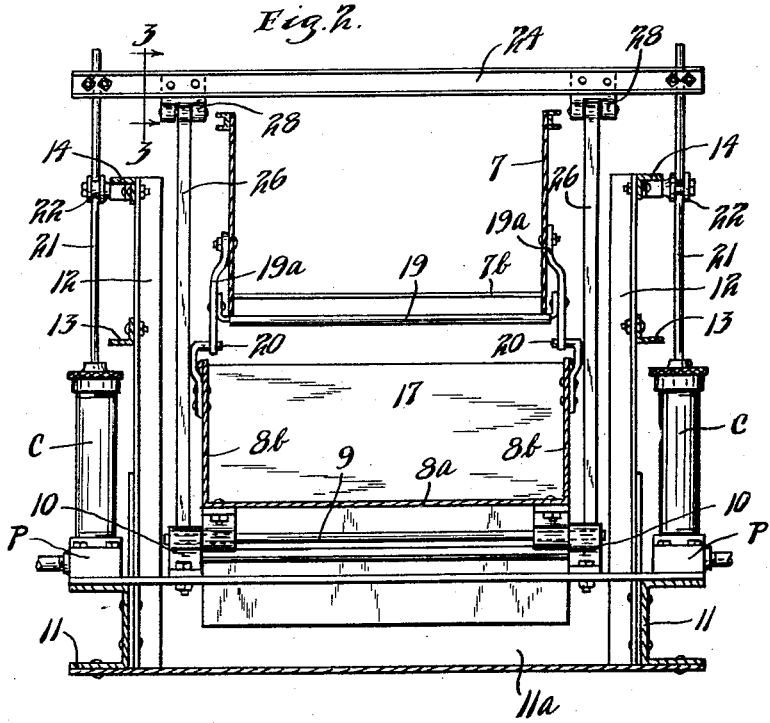

Patented Sept. 30, 1930

1,777,169

UNITED STATES PATENT OFFICE

FREDERICK W. JOHNSON, OF EXCELSIOR, MINNESOTA

PUMP JACK

Application filed October 19, 1928. Serial No. 313,466.

This invention relates to pump jacks and has for an object the provision of a comparatively simple, highly efficient pump jack adapted to be operated by the accumulation of water in a scale trough.

A further object is to provide a highly efficient pump jack, including a walking beam in the form of a scale trough adapted to be rocked by the alternate accumulation of a stream of water, such as waste water or drainage and having efficient connections between said scale trough and a battery of pumps equalizing the force of said walking beam and adapted to reciprocate the pump plungers with great power.

Another object of the invention is to provide a pump jack having a walking beam in the form of an elongated scale trough provided with a pair of compartments on opposite sides of its fulcrum, and means operated by the oscillation of said walking beam or scale trough for alternately distributing a supply of water to the two compartments of said scale trough, and efficient connections between said scale trough and the battery of pumps for reciprocating the pistons of said pumps rectilinearly.

These and other objects and advantages of the invention will be apparent from the following description made in connection with the accompanying drawings, in which like reference characters refer to similar parts throughout the several views and in which, Fig. 1 is a side elevation of a preferred embodiment of the invention with some parts broken away and others shown in section;

Fig. 2 is a cross section taken on the line 2—2 of Fig. 1, showing the connections between the walking beam or scale trough and the pistons of two of the pumps;

Fig. 3 is a cross section taken on the line 3—3 of Fig. 2, showing the connection of the pitman with the cross bars connected to the pump plungers;

Fig. 4 is a detail side elevation showing the connection of the lower ends of said pitman with the walking beam or scale trough;

Fig. 5 is a cross section taken on the line 5—5 of Fig. 4; and

Fig. 6 is a plan view showing the intake and discharge conduits for the battery of pumps and the connections between said pumps.

As shown in the drawings, a flume 7 is provided connected with a small stream of running water, such as a ditch or drain or any other suitable source of supply. The front forward end $7^a$ for the flume is closed and a discharge passage $7^b$ is formed through the bottom of said flume adjacent the forward end $7^a$. Directly below flume 7 is located the walking beam or scale trough 8 of my pump jack, having the bottom $8^a$ and a pair of vertical sides $8^b$. The scale trough 8 is fulcrumed on a transverse centrally disposed rock shaft 9 vertically alined with the discharge passage $7^b$ of flume 7 and suitably journaled at its ends in bearings 10. A suitable frame work, designated as an entirety by the letter F straddles scale trough 8 and flume 7 and as shown comprises a pair of spaced base channels 11 supporting bearings 10 for the fulcrum of the scale trough and having rigidly connected thereto a plurality of upright channel members 12, across which are connected an elongated pair of horizontal angle members 13, as shown, disposed slightly below the bottom of flume 7. The rear upright channel members 12 support at their upper ends a pair of horizontal cross bars 14, said cross bars supporting the flume 7.

The rear end of the frame F is closed by means of a vertical wall 15, while the forward end is open to permit discharge of liquid from the scale trough.

A segmental valve plate 16 is fixed to frame F at each end of scale trough 8 and said valve plates have their inner surfaces concentric with shaft 9, the fulcrum of said scale trough. Scale trough 8 has open ends also formed concentrically of its fulcrum 9 and said open ends work without friction but in close engagement with valve plates 16. A central vertical partition 17 divides the interior of scale trough 8 into two compartments and the valve plates 16 terminate short of the bottom $11^a$ of frame F to permit liquid to be discharged from the respective chambers of the scale trough when said trough is rocked to extreme position in either direction. Vertical wings 18 are secured to the sides of frame F adjacent the front and rear of said frame and at both sides thereof to prevent liquid from splashing out laterally from the frame.

A shift valve 19 comprising a segmental-shaped plate, slidably engaging arcuate guides at the lower edge of discharge passage 7ᵇ of the flume, is swingably mounted below said discharge passage by means of short arms 19ᵃ pivoted at their upper ends to the vertical walls of flume 7 and connected with the ends of the valve plate 19. The lower and free ends of arms 19ᵃ project some distance below valve 19 in position to be engaged by means of spaced striker members 20 rigidly carried by the upper edges of the scale trough 8, each side of said scale trough preferably being provided with a pair of said striker members and said striker members being spaced equi-distant from the vertical partition 17 of the trough.

A battery of pumps P, of any suitable type, such as the pump illustrated in my co-pending application, entitled "Pump structure", Serial Number 308,621 are secured to frame F, preferably to the base channels 11 and, as shown, two of said pumps are disposed at each side of frame F spaced equi-distant from the fulcrum 9 and having vertical pump cylinders C provided with suitable vertically reciprocable plungers to which the vertical plunger rods 21 are secured at their lower ends. The vertical plunger rods 21 are preferably disposed outwardly of frame F and the plungers of the forward pumps work between a pair of concave rollers 22, which may be mounted on the angle bar 13, while the plunger rods 21 of the rear pumps, which are longer than said first mentioned plunger rods works through similar guide rollers 22, which may be mounted on the upper horizontal bars 14 of the frame. The plunger rods 21 of the forward pumps are connected by a horizontal cross bar 23 disposed considerably above angle bars 13 and rigidly secured at its ends to the upper portion of said plunger rods. In like manner the upper ends of the plunger rods 21 of the rear pumps are connected together by means of a cross bar 24 disposed above flume 7. As shown in Figs. 2, 4 and 5, transverse cross bars 25 are secured beneath both compartments of the scale trough, their centers lying substantially in the same planes as the forward and rearward pairs of pumps respectively when the scale trough is balanced. Cross bars 25 project slightly beyond the vertical walls of trough 8 and terminate in pivots 25ᵃ to which the lower ends of pitmen 26 are loosely connected. The extremities of pivots 25ᵃ may be threaded to engage suitable retaining nuts 27 to prevent displacement of pitmen 26. The pitmen 26 for the rear pair of pumps are, of course, of necessity longer than the pitman for the forward pumps and the upper ends of all of said pitmen are pivotally connected with their respective cross bars 23 and 24 which secure the plunger rods of the respective pairs of pumps for being driven in unison. As shown, depending hinge members 28 are secured to cross bars 23 and 24, between which the upper ends of the pitmen 26 are pivotally secured.

As shown in Fig. 6, the intake ends of the two pumps at each side of frame F may be connected together by suitable coupling conduits 29 and cross pipe 30 may connect conduits 29. An intake conduit 31 may communicate with one of the coupling conduits 29. In similar manner, the discharge chambers of the pumps P at each side of frame F may be connected together by means of coupling conduits 32, said coupling conduits being connected together by means of a cross pipe 33 and one of said coupling conduits connected with discharge pipe 34. Water may be pumped from the supply discharge from the scale trough or from any other suitable source. An obstruction tube 35 preferably having sealed ends to confine air therewithin is disposed transversely of the lower part of frame F and at the forward or delivery end of the device. It may be guided by the vertical inturned flanges of the forward angle posts 12.

Operation

The operation of my pump jack may be briefly described as follows:—

When the walking beam or scale trough is in the position shown in Fig. 1, with the shift valve 19 disposed as shown, water will be delivered through the discharge passage 7ᵇ of flume 7, into the forward chamber of the scale trough and when the weight of the accumulated water is adequate to overcome the resistance of the several pumps the forward or right hand end of the scale trough or walking beam will swing downwardly with great force, gaining momentum in its downward movement due to the fact that the leverage is increased as it approaches its extreme downward position. The engagement between the ends of the scale trough and the valve plates 16 retains the water within the chambers of the scale trough until the bottom of the trough has been swung below the lower edge of the valve plates. Water then escapes below the valve plate, running down between the channel members 11 of the frame F and being discharged from the right hand or delivery end of the frame. Pressure of this water against obstruction tube 35 causes the tube to be raised slightly impeding the flow of water so that a sufficient supply of water is maintained in the right hand end of the frame to cushion the force of the right hand end of the scale trough and to break the impact. The downward movement of the right hand end of the scale trough causes the left hand striker plates 20 to engage the valve arms 19ª throwing the shift valve to the extreme right position and subsequently causing water to be delivered to the rearward or left hand chamber of the scale trough. The oscillation of the walking beam or scale trough, of course, drives pitmen 26 with great force, causing the cross bars 23 and 24 to be raised and lowered rectilinearly and thus conjointly operating the battery of pumps. Since a pair of pumps are disposed at the right hand side of the fulcrum 9 for the walking beam or scale trough and a pair disposed at the left hand side, the strain and practically all of the weight is taken off of the fulcrum 9 and the resistance at both sides of the fulcrum is equalized and the force of the swinging movement of said trough cushioned. In other words, the walking beam is supported at all times by the two pairs of pumps disposed on opposite sides of the fulcrum and the fulcrum or shaft 9 serves only to position the scale beam for oscillation. The guide rollers 22 maintain the plunger rods 21 of the pumps at all times in vertical position, while permitting free reciprocation thereof without wear. The speed of the pumps, of course, depend upon the rapidity of the alternate accumulations of water in the two chambers of the walking beam, but the device may be operated obviously with a very small stream of waste water flowing through the flume 7. It will be seen that the walking beam or scale trough may be made of such proportion as to develop great pumping power through its connections with the pitmen and plungers of the several pumps.

From the foregoing description it will be seen that I have invented a novel and highly efficient pump jack especially adapted for operating a battery of pumps where the power is furnished by gravity with the alternate accumulation of water in the two chambers of the walking beam or scale trough.

It will, of course, be understood that various changes may be made in the form, details, arrangement and proportions of the parts without departing from the scope of applicant's invention.

What is claimed is:

1. A pump jack for operating at least a pair of pumps comprising a frame having spaced sides, a walking beam in the form of a scale trough provided with a central partition which defines compartments at each side thereof, a horizontal shaft beneath said partition and journaled in the sides of said frame, consitituting a fulcrum for said walking beam, means for delivering material alternately to the two compartments of said scale trough to oscillate the same, a vertically reciprocable plunger rod adjacent the base of said frame and disposed at one side of said fulcrum and a similar plunger rod on the opposite side of said fulcrum and equi-distant with said first plunger rod from said fulcrum, guides on said frame for said plunger rods, and a pair of pitmen each pivotally connected to an intermediate portion of one of said compartments at one end and having its other end connected to said plunger.

2. A pump jack comprising a frame having spaced sides, a walking beam in the form of a scale trough having a pair of receiving compartments and provided with a horizontal fulcrum journaled in the sides of said frame, means for delivering material alternately to said two compartments to oscillate said walking beam, two pairs of vertically reciprocable plunger rods, said pairs being disposed equi-distant at opposite sides of said fulcrum, one rod of each pair being at one side of said walking beam and one at the opposite side thereof, a cross bar connecting each pair of plunger rods and two pairs of pitmen, one pair extending at the sides of one of said compartments and the other pair extending at the sides of the opposite compartment, said first pair connecting one end of said walking beam with one of said cross bars and said second pair connecting the opposite side of said walking beam with said second cross bar, whereby said plungers support said walking beam and relieve said fulcrum of the greater part of the weight and strain thereof.

In testimony whereof I affix my signature.

FREDERICK W. JOHNSON.